United States Patent
Lee et al.

(10) Patent No.: US 10,972,981 B2
(45) Date of Patent: Apr. 6, 2021

(54) METHOD FOR PERFORMING DRX OPERATION IN WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 339 days.

(21) Appl. No.: 16/063,971

(22) PCT Filed: Jan. 5, 2017

(86) PCT No.: PCT/KR2017/000121
§ 371 (c)(1),
(2) Date: Jun. 19, 2018

(87) PCT Pub. No.: WO2017/119729
PCT Pub. Date: Jul. 13, 2017

(65) Prior Publication Data
US 2020/0275376 A1 Aug. 27, 2020

Related U.S. Application Data

(60) Provisional application No. 62/274,777, filed on Jan. 5, 2016.

(51) Int. Cl.
*H04W 72/04* (2009.01)
*H04L 5/00* (2006.01)
(Continued)

(52) U.S. Cl.
CPC ....... *H04W 52/0251* (2013.01); *H04L 1/1812* (2013.01); *H04W 76/28* (2018.02)

(58) Field of Classification Search
CPC ... H04W 88/06; H04W 84/042; H04W 52/04; H04W 12/001; H04W 12/06;
(Continued)

(56) References Cited

U.S. PATENT DOCUMENTS

2010/0105390 A1* 4/2010 Ishii ................. H04W 72/0406
455/436
2010/0238875 A1* 9/2010 Sung .................... H04L 1/1854
370/329

(Continued)

FOREIGN PATENT DOCUMENTS

KR 1020110025048 3/2011

OTHER PUBLICATIONS

PCT International Application No. PCT/KR2017/000121, Written Opinion of the International Searching Authority dated Apr. 12, 2017, 8 pages.

(Continued)

*Primary Examiner* — Sai Aung
(74) *Attorney, Agent, or Firm* — Lee, Hong, Degerman, Kang & Waimey PC

(57) ABSTRACT

The present invention relates to a wireless communication system. More specifically, the present invention relates to a method and a device for performing DRX operation in wireless communication system, the method comprising: generating a MAC PDU including an indicator indicating the MAC PDU is a last MAC PDU to be transmitted to an eNB if the generated MAC PDU is a last MAC PDU to be transmitted to the eNB; transmitting the MAC PDU including the indicator; and starting using a DRX cycle right after the UE considers that the transmission of MAC PDU is successful.

16 Claims, 6 Drawing Sheets

(51) Int. Cl.
*H04W 52/02* (2009.01)
*H04W 76/28* (2018.01)
*H04L 1/18* (2006.01)

(58) Field of Classification Search
CPC ..... H04W 36/08; H04W 36/18; H04W 52/12;
H04W 80/04; H04W 88/12; H04W
72/042; H04W 72/0446; H04W 48/16;
H04W 72/0406; H04W 8/005; H04W
72/04; H04W 72/0453; H04W 12/0609
See application file for complete search history.

(56) References Cited

U.S. PATENT DOCUMENTS

| | | | |
|---|---|---|---|
| 2012/0039243 A1* | 2/2012 | Park | H04B 7/155 370/315 |
| 2012/0106477 A1* | 5/2012 | Kwon | H04W 52/365 370/329 |
| 2014/0328289 A1* | 11/2014 | Kim | H04W 76/28 370/329 |
| 2015/0110040 A1 | 4/2015 | Zhao | |
| 2015/0189690 A1 | 7/2015 | Lee et al. | |

OTHER PUBLICATIONS

Ericsson, "NB-IOT Paging and DRX", 3GPP TSG RAN WG2 Meeting #91bis, R2-154478, Oct. 2015, 5 pages.

* cited by examiner

[Fig. 1]
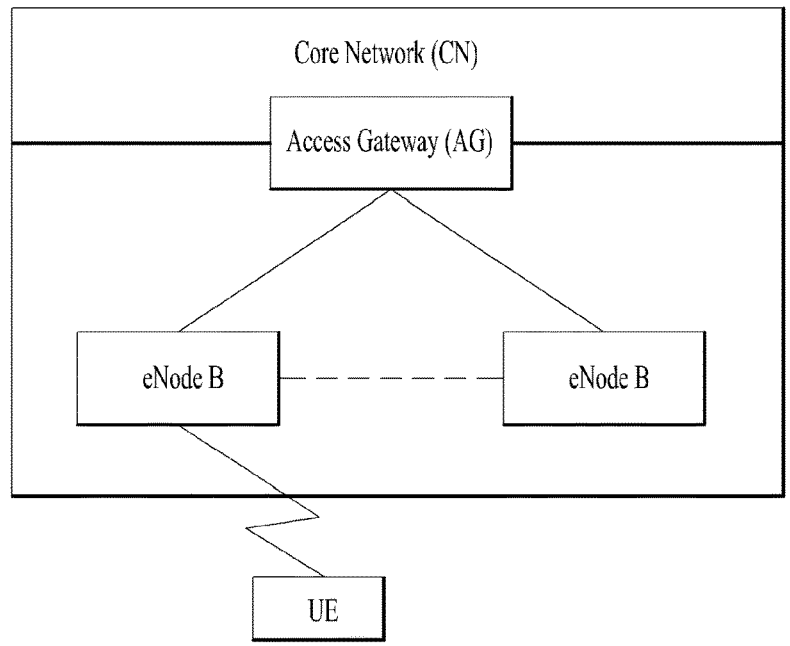
[Fig. 2A]
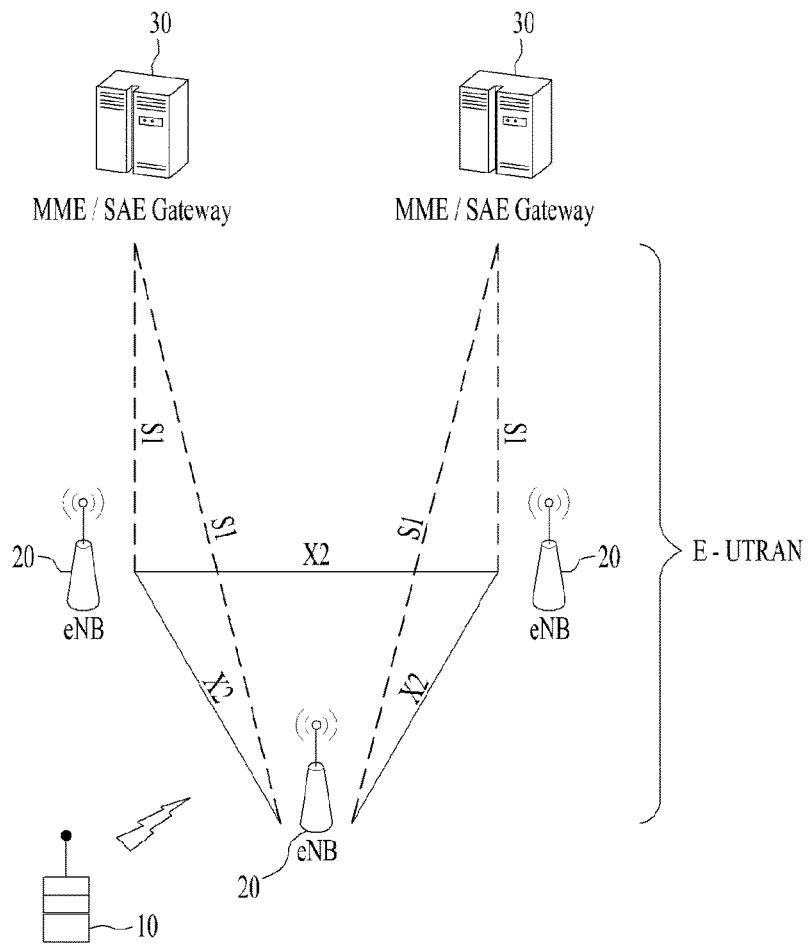

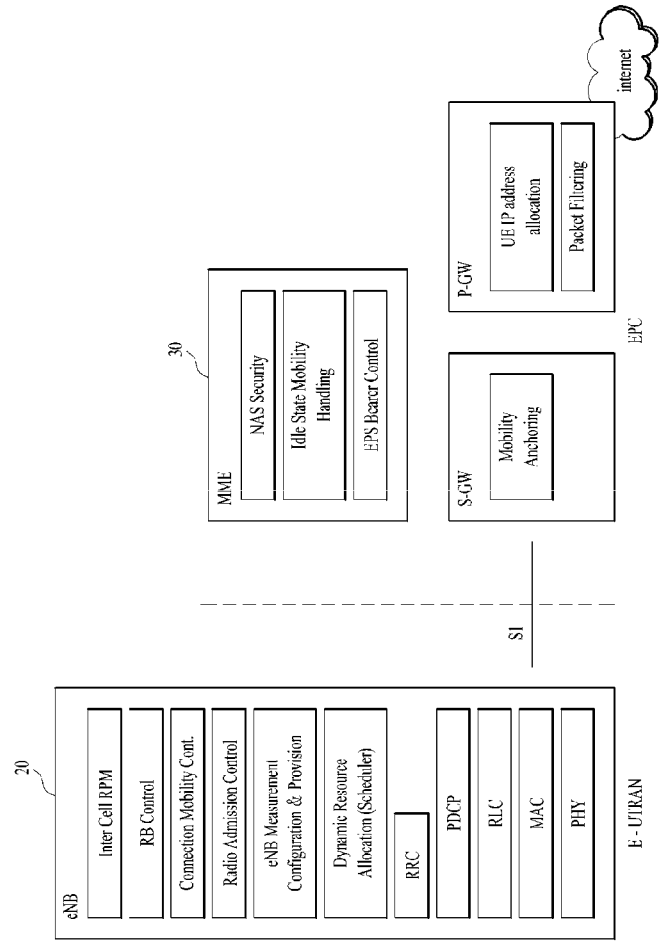
[Fig. 2B]

[Fig. 3]
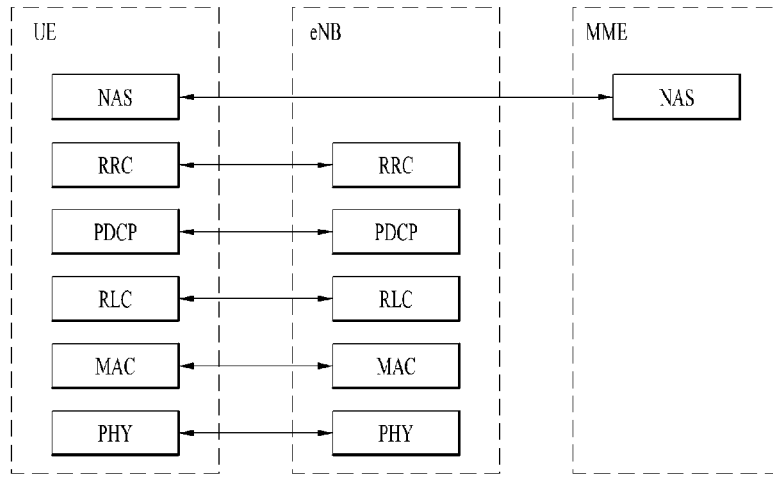
(a) Control-Plane Protocol Stack
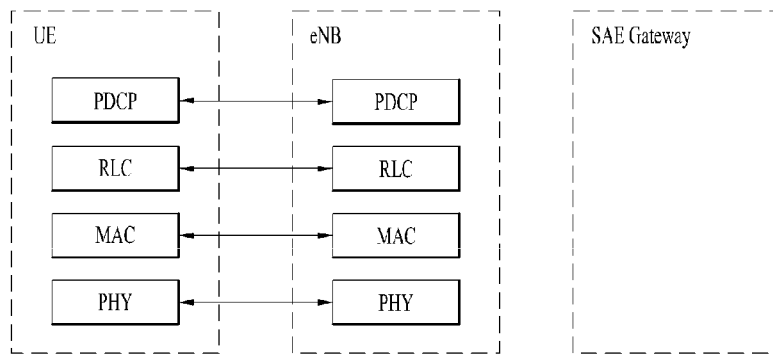
(b) User-Plane Protocol Stack
[Fig. 4]
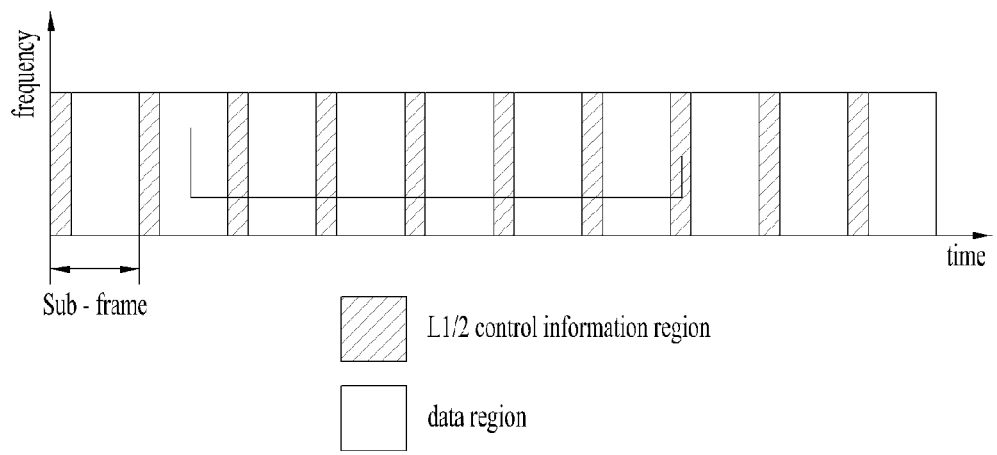

[Fig. 5]
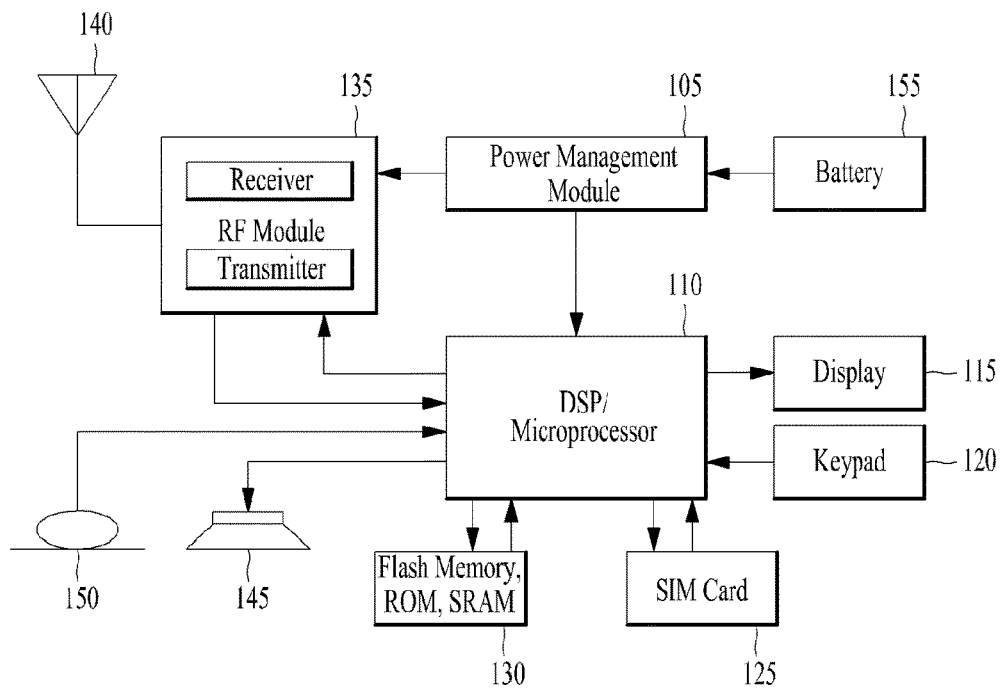
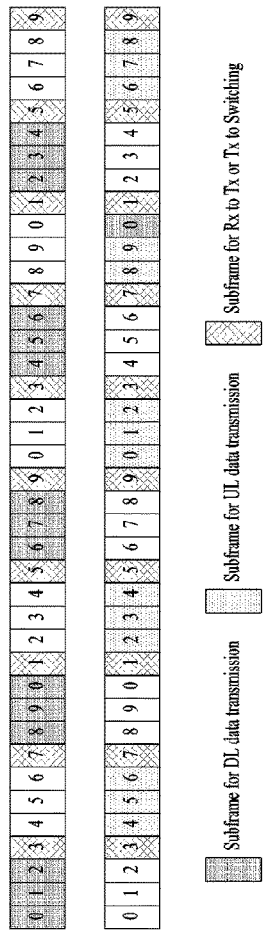
[Fig. 6A]

[Fig. 6B]
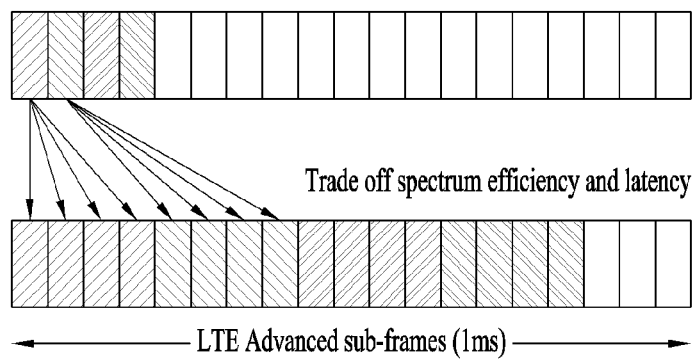
[Fig. 7]
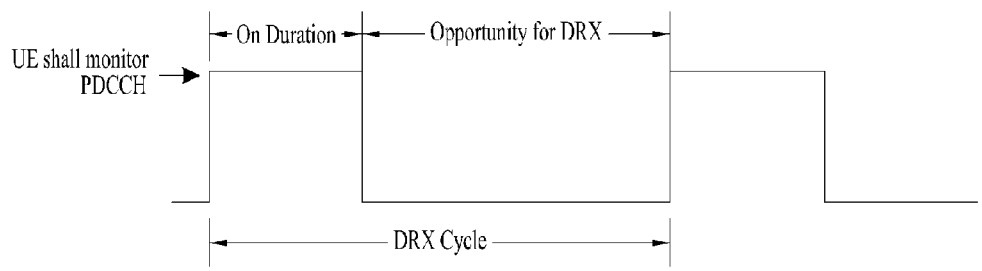
[Fig. 8]
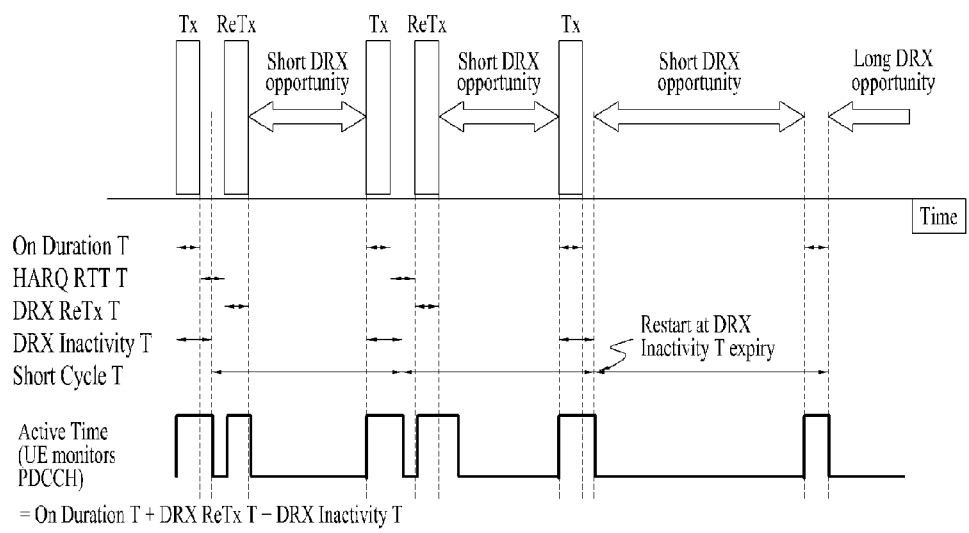

[Fig. 9]
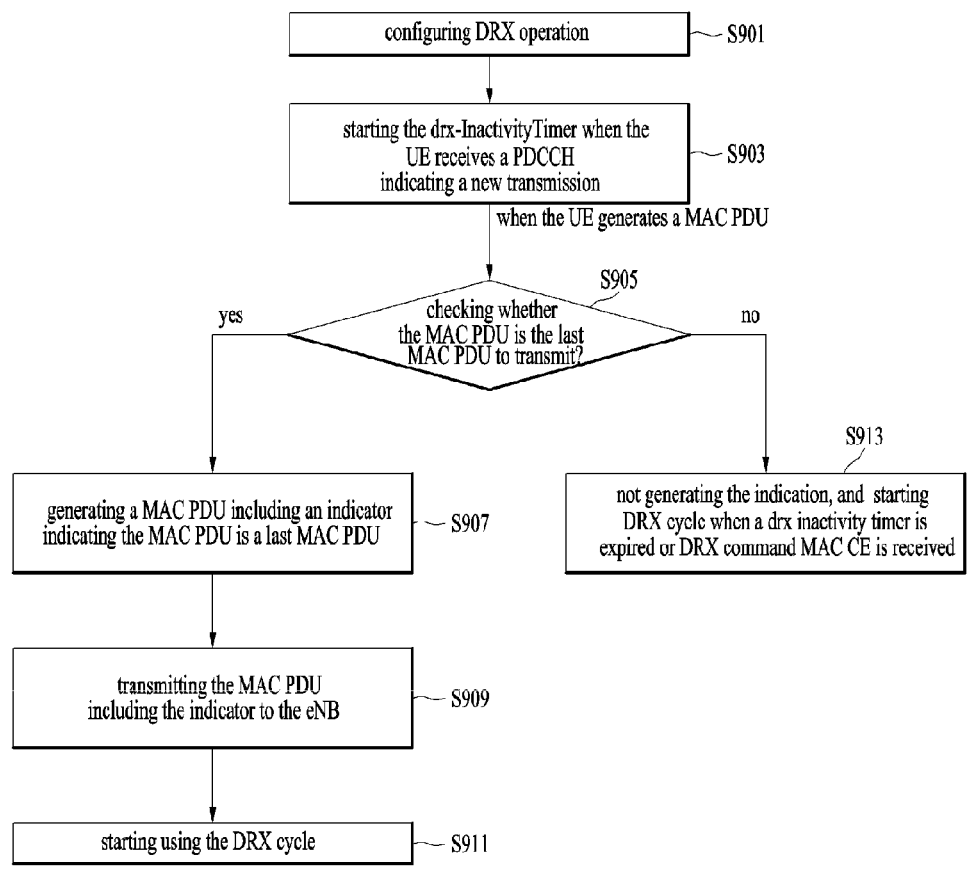

METHOD FOR PERFORMING DRX OPERATION IN WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2017/000121, filed on Jan. 5, 2017, which claims the benefit of U.S. Provisional Application No. 62/274,777, filed on Jan. 5, 2016, the contents of which are all hereby incorporated by reference herein in their entirety.

TECHNICAL FIELD

The present invention relates to a wireless communication system and, more particularly, to a method for performing DRX operation in wireless communication system and a device therefor

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing DRX operation in wireless communication system.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

It is invented that an UE starts using a DRX Cycle immediately after the UE transmits the last MAC PDU to an eNB.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6A is an example for data transmission and reception for a Category 0 low complexity UE, FIG. 6B is an example for repetitions for data transmission for a Category 0 low complexity UE;

FIG. 7 is a diagram showing a concept of DRX (Discontinuous Reception);

FIG. 8 is a diagram showing a method for a DRX operation in the LTE system; and

FIG. 9 is a conceptual diagram for performing DRX operation in wireless communication system according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6A is an example for data transmission and reception for a Category 0 low complexity UE, and FIG. 6B is an example for repetitions for data transmission for a Category 0 low complexity UE.

Such a communication technology as MTC is specialized from 3GPP to transmit and receive IoT-based information and the MTC has a difference according to each release of the technology. Release 10 and Release 11 are focusing on a method of controlling loads of IoT (M2M) products and a method of making the loads have least influence on a network when the IoT products make a request for accessing an eNB at the same time. Release 12 and Release 13 are focusing on a low-cost technology enabling a battery to be simply implemented and very little used by reducing complicated functions mounted on a legacy smartphone as many as possible.

Low complexity UEs are targeted to low-end (e.g. low average revenue per user, low data rate, delay tolerant) applications, e.g. some Machine-Type Communications.

A low complexity UE has reduced Tx and Rx capabilities compared to other UE of different categories.

In particular, a low complexity UE does not require such a function of high performance as a function of a smartphone and an amount of data used by the low complexity UE is not that big in general. Hence, there is no reason for a complicated and high-price communication module to come to the market for such a UE as the low complexity UE.

In order to manufacture a low-cost IoT (M2M) device, a concept such as UE Category 0 has been introduced. A UE category corresponds to a general figure used in 3GPP to indicate the amount of data capable of being processed by a UE in a communication modem. In general, as the amount of data to be processed is getting bigger, a price of a modem is also increasing due to a memory or performance enhancement. In case of a currently commercialized smartphone, performance of the smartphone is continuously increasing from 100 Mbps to 150 Mbps and 300 Mbps on the basis of download.

Table 1 shows UE categories used in 3GPP.

TABLE 1

| UE Category | Downlink (velocity) | Uplink (velocity) |
| --- | --- | --- |
| 0 | 1 Mbps | 1 Mbps |
| 1 | 10 Mbps | 5 Mbps |
| 2 | 50 Mbps | 25 Mbps |
| 3 | 100 Mbps | 50 Mbps |
| 4 | 150 Mbps | 50 Mbps |
| 5 | 300 Mbps | 75 Mbps |
| 6 | 300 Mbps | 50 Mbps |
| 7 | 300 Mbps | 100 Mbps |
| 8 | 3 Gbps | 1.5 Gbp |
| 9 | 450 Mbps | 50 Mbps |
| 10 | 450 Mbps | 100 Mbps |
| 11 | 600 Mbps | 50 Mbps |
| 12 | 600 Mbps | 100 Mbps |
| 13 | 400 Mbps | 50 Mbps |

A Category 0 low complexity UE may access a cell only if SIB1 indicates that access of Category 0 UEs is supported. If the cell does not support access of Category 0 UEs, the UE considers the cell as barred.

The eNB determines that a UE is a Category 0 UE based on the LCID for CCCH and the UE capability.

The S1 signalling has been extended to include the UE Radio Capability for paging. This paging specific capability information is provided by the eNB to the MME, and the MME uses this information to indicate to the eNB that the paging request from the MME concerns a low complexity UE.

And, since it is able to perform transmission and reception on specific time only without performing transmission and reception at the same time like FIG. 6A, it may be able to perform an operation of TDD in FDD (since transmission and reception are not performed at the same time). Additionally, unlike legacy TDD, since it is able to provide sufficient switching time as much as 1 ms to a section at which switching is performed between transmission and reception, it is able to expect a revolutionary cost reduction effect in terms of overall hardware part especially a modem and an RF. On the contrary, according to a regulation of a legacy LTE UE, it is mandatory to use at least 2 or more reception antennas.

NB-IoT (Narrow Band Internet of Things) provides access to network services using physical layer optimized for very low power consumption (e.g. full carrier bandwidth is 180 kHz, subcarrier spacing can be 3.75 kHz or 15 kHz).

As indicated in the relevant subclauses in this specification, a number of E-UTRA protocol functions supported by all Rel-8 UEs are not used for NB-IoT and need not be supported by eNBs and UEs only using NB-IoT. For NB-IoT, the narrowband physical downlink control channel (NPDCCH) is located in available symbols of configured subframes. Within a PRB pair, two control channel elements are defined, with each control channel element composed of resources within a subframe. NPDCCH supports aggregations of 1 and 2 control channel elements and repetition. NPDCCH supports C-RNTI, Temporary C-RNTI, P-RNTI, and RA-RNTI.

The contention-based random access is supported for NB-IoT. Configuration of RACH parameters may be different per coverage level. RACH attempts/reattempts should follow the assumptions listed below: i) Multiple RACH attempts are supported, ii) RACH reattempts may be done on the same or different coverage level, iii) Triggering too many attempts needs to be avoided. There will be one or more thresholds that limit the number of attempts, MAX NUMBER OF ATTEMPTS or similar per coverage level, and iv) MAC indicates random access problem to the RRC layer, when MAC has exhausted all attempts for a RACH procedure.

RAN node can determine the UE's coverage level from the random access procedure. How this is done depends on the physical layer RACH design. The original eMTC design, e.g. by using S1 Context Release message to indicate coverage level, can be used as the baseline, at least for the UP solution. The CN may include coverage enhancement (CE) level information, Global Cell Id and Paging Attempt Count IE in the Paging message to indicate related information to the RAN node. In idle mode, UEs in general do not make specific access only to report coverage level change.

For NB-IoT, Asynchronous adaptive HARQ is supported, a single HARQ process is supported for dedicated transmissions (1 for UL and 1 for DL), and An NB-IoT UE only needs to support half duplex operations.

For NB-IoT, the RLC layer supports the following functions: i) Transfer of upper layer PDUs, ii) Concatenation, segmentation and reassembly of RLC SDUs. But the following RLC layer functions are assumed not supported: i)

Reordering of RLC data PDUs (dependent on HARQ mechanism), ii) Duplicate detection (dependent on HARQ mechanism), and iii) the RLC UM is not supported.

The PDCP layer supports the following functions: i) PDCP SN size is 7 bits (or less), ii) Transfer of data (user plane or control plane), iii) Header compression and decompression of IP data flows using the ROHC protocol, iv) Ciphering and Integrity Protection, and v) Ciphering and deciphering. But the following PDCP layer functions are assumed not supported: i) In-sequence delivery of upper layer PDUs at PDCP re-establishment procedure for RLC AM (dependent on support of RRC reestablishment and RLC-AM), ii) Duplicate detection and duplicate discarding of lower layer SDUs at PDCP re-establishment procedure for RLC AM (dependent on support of RRC reestablishment and RLC-AM), iii) Duplicate detection and duplicate discarding of lower layer SDUs at PDCP re-establishment procedure for RLC AM (dependent on support of RRC reestablishment and RLC-AM, iv) For split bearers, routing and reordering, and v) PDCP status report.

In particular, discussion on a solution for a performance deterioration problem caused by decrease of output power is in progress by considering a scheme of performing repetitive transmission as shown in FIB. 6B or a TTI bundling technology previously used in VoLTE (Voice of LTE, LTE voice call service). Consequently, it might say that it is able to develop a communication module of low complexity through the low-cost IoT (M2M) technology explained in the Release 12 and the low-power IoT (M2M) technology to which the Release 13 is targeting.

FIG. 7 is a diagram showing a concept of DRX (Discontinuous Reception).

Referring to FIG. 7, if DRX is set for a UE in RRC CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration?. One On Duration is defined per DRX cycle. That is, a DRX cycle is a repetition period of On Duration.

The UE always monitors a PDCCH during On Duration in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-InactivityTimer or a retransmission managing timer, drx-RetransmissionTimer as well as an On Duration managing timer, onDurationTimer is running.

The value of each of the timers is defined as the number of subframes. The number of subframes is counted until the value of a timer is reached. If the value of the timer is satisfied, the timer expires. The current LTE standard defines drx-InactivityTimer as a number of consecutive PDCCH-subframes after successfully decoding a PDCCH indicating an initial UL or DL user data transmission and defines drx-RetransmissionTimer as a maximum number of consecutive PDCCH-subframes for as soon as a DL retransmission is expected by the UE.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) onDurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

FIG. 8 is a diagram showing a method for a DRX operation in the LTE system.

Referring to FIG. 8, the UE may be configured by RRC with a DRX functionality and shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop onDurationTimer and drx-InactivityTimer. The DRX Command MAC CE is a command for shifting to a DRX state, and is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drxShortCycleTimer, and use the Short DRX Cycle. However, if the Short DRX cycle is not configured, the Long DRX cycle is used. Additionally, if drxShortCycleTimer expires in this subframe, the Long DRX Cycle is also used.

The UE shall monitor the PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL or UL) new transmission, the UE shall start or restart drx-InactivityTimer.

Here, the PDCCH-subframe is defined as a subframe with PDCCH. That is, the PDCCH-subframe is a subframe on which the PDCCH can be transmitted. More specifically, in a FDD (frequency division duplex) system, the PDCCH-subframe represents any subframe.

For full-duplex TDD (time division duplex) system, the PDCCH-subframe represents the union of downlink subframes and subframes including DwPTS of all serving cells, except serving cells that are configured with schedulingCellId (that is, the Scheduled cell). Here, the schedulingCellId indicates an identity of the scheduling cell. Further, for half-duplex TDD system, the PDCCH-subframe represents the subframes where the PCell (primary cell) is configured as a downlink subframe or a subframe including DwPTS.

Meanwhile, when not in Active Time, the UE does not perform a SRS (Sounding Reference Signal) transmission and a CSI reporting, which are triggered by the eNB.

During the above DRX operation, only the HARQ RTT Timer is fixed to 8 ms, whereas the eNB indicates the other timer values, onDurationTimer, drx-InactivityTimer, drx-RetransmissionTimer, and mac-ContentionResolutionTimer to the UE by an RRC signal. The eNB also indicates a long DRX cycle and a short DRX cycle, which represent the period of a DRX cycle, to the UE by an RRC signal.

As per DRX operation, the UE starts/restarts drx-InactivityTimer when the UE receives a PDCCH indicating a new transmission. The UE starts using DRX cycle when drx-InactivityTimer expires or a DRX Command MAC control element is received. And the drx-InactivityTimer can be from 1 PDCCH-subframe up to 2560 PDCCH-subframes.

The drx-InactivityTimer would be configured by considering the opportunity for scheduling a new transmission.

In LTE, with support of DRX the UE can save battery consumption by monitoring PDCCH only during the Active Time, which is determined by the DRX timers and scheduling.

For example, when either the UE receives the DRX command MAC CE from the eNB or the drx-InactivityTimer expires, the UE starts using the DRX cycle and monitoring PDCCH during On Duration of each Cycle.

In IOT, the UE transfer data for multiple repetition times in order to improve the signal power. With multiple repetition transmission, DRX timers, e.g., drx-InactivityTimer, may be set to quite long values in order not to delay the next scheduling. In this case, after the UE transmits the last uplink data, the UE will stay in the Active Time for a long time until when either drx-InactivityTimer expires or DRX command MAC CE is received. This would sacrifice UE battery unnecessarily even though the UE clearly knows that there would be no longer uplink scheduling. As the UE's battery saving is one of the most important keys in IOT, it would require a mechanism that the UE quickly enters the DRX cycle once the UE knows that there would be no more scheduling/transmission.

In the scope of eMTC, RAN2 has discussed DRX operation. Considering repetition transmission/reception in eMTC, RAN2 decided that drx-InactivityTimer is started after the last subframe of M-PDCCH repetition. Similarly, for NB-IOT, we assume repetition transmission/reception and look into when DRX cycle starts:

Step0. The UE has a small data and requests an UL grant for the small data transmission.
Step1. The UE receives an UL grant by repetition reception, and starts drx-InactivityTimer at the end of PDCCH repetition for the UL grant.
Step2. The UE transmits an MAC PDU including the data by repetition transmission.
Step3. The UE keeps monitoring PDCCH while drx-InactivityTimer is running.
Step4. When drx-InactivityTimer expires, the UE starts using DRX cycle.

We can observe that the UE keeps monitoring PDCCH after transmission of the MAC PDU for additional scheduling opportunity. And then, the UE finally starts using DRX cycle after drx-InactivityTimer expiry. Even for the last MAC PDU transmission, the UE keeps monitoring PDCCH due to drx-InactivityTimer which has been started upon reception of PDCCH for the UL grant. Note that, in NB-IOT, we assume that drx-InactivityTimer would be a long value because of repetition transmission/reception.

In LTE, it can be assumed that the UE, in general, wouldn't be provided an UL grant that can accommodate all data at once. Thus, the UE would need to wait for another scheduling in order to transmit the remaining data. In this case, applying the same UE behaviour even for the last data transmission, i.e., keeping monitoring PDCCH even after the last data transmission, would make the specification simple while not brining any critical problem.

In NB-IOT, however, the data would be typically a small data so that one shot transmission would be generally sufficient. Accordingly, mandating the UE to monitor the PDCCH even after the last data transmission would bring unnecessary PDCCH monitoring more frequently compared to LTE. Given that power consumption is one critical designing factor in NB-IOT, it seems not desirable.

Based on the problem as above mentioned, it would be good to enhance DRX operation for NB-IOT.

Option 1 is that the UE starts using the DRX cycle when the UE transmits the last data of a data burst to the eNB. The gain would be that UE saves power consumption by using the DRX cycle without waiting for drx-InactivityTimer expiry. Given that a long drx-InactivityTimer value would be used for NB-IOT, a significant power saving gain is expected.

One issue with Option 1 is that the UE autonomously goes into DRX cycle when it sends the last data of a data burst. This may cause desynchronization of DRX state between UE and eNB, which would bring waste of radio resource or unnecessary PDCCH monitoring.

Therefore, the UE needs to send a kind of indication to the eNB when it sends the last data of a data burst so that the eNB knows that the UE goes into DRX cycle. For example, BSR with zero buffer status could be used for this purpose.

One may say that the eNB can send a DRX command MAC CE upon reception of the last data indication from the UE. However, it costs the UE's monitoring and processing power of the DRX command MAC CE. Having repetition transmission/reception, the cost would be increased for NB-IOT. With an intention of saving UE power consumption in NB-IOT, it would be helpful to start using DRX cycle even without the DRX command MAC CE in terms of power saving.

FIG. 9 is a conceptual diagram for performing DRX operation in wireless communication system according to embodiments of the present invention.

It is invented that an UE starts using a DRX Cycle immediately after the UE transmits the last MAC PDU to an eNB. In detail, the UE transmits an End of Data Indication to the eNB when the UE transmits the last MAC PDU to the eNB. And then, the UE starts using the DRX cycle when the UE considers that the last MAC PDU is successfully transmitted to the eNB.

The UE is configured with DRX by the eNB including: DRX timers, for example, drx-InactivityTimer and/or onDurationTimer, and at least one DRX cycle (S901).

The UE starts the drx-InactivityTimer when the UE receives a PDCCH indicating a new transmission, e.g., UL grant (S903).

When the UE generates a MAC PDU to transmit to the eNB, the UE checks whether the MAC PDU is the last MAC PDU to transmit or not (S905).

If the generated MAC PDU is a last MAC PDU to be transmitted to the eNB, the UE generates a MAC PDU including an indicator indicating the MAC PDU is a last MAC PDU to be transmitted to an eNB (S907).

Preferably, the UE considers that the data is the last MAC PDU if there is no data available for transmission in PDCP and RLC after transmitting the generated MAC PDU.

Preferably, the indication can be one of the followings: i) a Buffer Status Reporting including the buffer size which is set to zero; ii) an RLC Framing Info (RLC FI) field which is set to a value indicating that the last byte of the Data field of RLC PDU corresponds to the last byte of a RLC SDU, i.e., 00 or 10; or; iii) an explicit indicator indicating that the MAC PDU is the last MAC PDU to be transmitted by the UE, which can be transmitted via a MAC subheader, a MAC control element, an RLC subheader, or an RLC control PDU.

The UE transmits the MAC PDU including the indicator to the eNB (S909).

If the UE transmits the last MAC PDU to the eNB, the UE considers that the transmission of MAC PDU is successful and starts using the DRX cycle when i) the UE transmits the the indicator to the eNB, or ii) the UE receives an Acknowledgement Information for the last MAC PDU after the UE transmits the Indication to the eNB (S911).

Preferably, the Acknowledgement Information for the last MAC PDU can be one of the followings: i) HARQ Acknowledgement feedback for the last MAC PDU; or ii) an UL grant for a new transmission; or iii) any form of feedback indicating that the last MAC PDU is successfully received or decoded by the eNB.

According to this invention, the UE starts the DRX cycle right after the UE considers that the transmission of MAC PDU is successful, even if a drx inactivity timer is running or DRX command MAC CE is not received. When the UE starts using the DRX cycle, the UE can additionally stop the drx-InactivityTimer if running.

If the generated MAC PDU is not a last MAC PDU to be transmitted to the eNB, the UE doesn't generated the indication, and starts DRX cycle when a drx inactivity timer is expired or DRX command MAC CE is received (S913).

Additionally, in case the UE performs repetition transmission of an MAC PDU within an attempt, a time when the UE transmits the indication to the eNB refers the time when the UE transmits the last repetition transmission of the indication within the attempt. And a time when the UE receives an Acknowledgement Information for the MAC PDU refers the time when the UE receives the last repetition transmission of the Acknowledgement Information within the attempt; or the time when the UE successfully decodes the Acknowledgement Information within the attempt even before the last repetition transmission of the Acknowledgement Information.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a user equipment (UE) operating in a wireless communication system, the method comprising:
    generating a Medium Access Control (MAC) Protocol Data Unit (PDU) including an indicator indicating the MAC PDU is a last MAC PDU to be transmitted to an eNB if the generated MAC PDU is a last MAC PDU to be transmitted to the eNB;
    transmitting the MAC PDU including the indicator; and
    starting using a Discontinuous Reception (DRX) cycle right after the UE considers that the transmission of MAC PDU is successful, even if a drx inactivity timer is running or DRX command MAC Control element (CE) is not received.

2. The method according to claim 1, wherein the UE considers that the generated MAC PDU is the last MAC PDU to be transmitted to the eNB if there is no data available for transmission in a Packet Data Convergence Protocol (PDCP) and a Radio Link Control (RLC) entities after transmitting the generated MAC PDU.

3. The method according to claim 1, wherein the indicator is at least one of:
    a buffer status reporting including a buffer size set to zero; or a Radio Link Control (RLC) PDU including an RLC Frame Info field set to a value indicating that a last byte of a data field of RLC PDU corresponds to a last byte of a RLC Service Data Unit (SDU).

4. The method according to claim 1, wherein the indicator is transmitted via at least one of a MAC subheader, a MAC control element, an RLC subheader, or an RLC control PDU.

5. The method according to claim 1, wherein the UE considers that the transmission of MAC PDU is successful, when the MAC PDU including the indicator is transmitted.

6. The method according to claim 1, wherein the UE considers that the transmission of MAC PDU is successful, when Acknowledgement Information for the last MAC PDU transmission is received.

7. The method according to claim 6, wherein the Acknowledgement Information for the last MAC PDU is one of Hybrid-ARQ (HARD) Acknowledgement feedback for the last MAC PDU, or an UL grant for a new transmission, or any form of feedback indicating that the last MAC PDU is successfully received or decoded by the eNB.

8. The method according to claim 1, wherein the UE is a Narrow Band Internet of Things (NB-IoT) UE.

9. A user equipment (UE) for operating in a wireless communication system, the UE comprising
a transmitter;
a receiver; and
a processor operably coupled with the transmitter and receiver,
wherein the processor is configured to,
generate a Medium Access Control (MAC) Protocol Data Unit (PDU) including an indicator indicating the MAC PDU is a last MAC PDU to be transmitted to an eNB if the generated MAC PDU is a last MAC PDU to be transmitted to the eNB,
wherein the transmitter is configured to transmit the MAC PDU including the indicator, and
wherein the processor is configured to start using a Discontinuous Reception (DRX) cycle right after the UE considers that the transmission of MAC PDU is successful even if a drx inactivity timer is running or DRX command MAC Control element (CE) is not received.

10. The UE according to claim 9, wherein the processor considers that the generated MAC PDU is the last MAC PDU to be transmitted to the eNB if there is no data available for transmission in a Packet Data Convergence Protocol (PDCP) and a Radio Link Control (RLC) entities after transmitting the generated MAC PDU.

11. The UE according to claim 9, wherein the indicator is at least one of:
a buffer status reporting including a buffer size set to zero; or
a Radio Link Control (RLC) PDU including an RLC Frame Info field set to a value indicating that a last byte of a data field of RLC PDU corresponds to a last byte of a RLC Service Data Unit (SDU).

12. The UE according to claim 9, wherein the indicator is transmitted via at least one of a MAC subheader, a MAC control element, an RLC subheader, or an RLC control PDU.

13. The UE according to claim 9, wherein the processor considers that the transmission of MAC PDU is successful, when the MAC PDU including the indicator is transmitted.

14. The UE according to claim 9, wherein the processor considers that the transmission of MAC PDU is successful, when Acknowledgement Information for the last MAC PDU transmission is received.

15. The UE according to claim 14, wherein the Acknowledgement Information for the last MAC PDU is one of Hybrid-ARQ (HARD) Acknowledgement feedback for the last MAC PDU, or an UL grant for a new transmission, or any form of feedback indicating that the last MAC PDU is successfully received or decoded by the eNB.

16. The UE according to claim 9, wherein the UE is a Narrow Band Internet of Things (NB-IoT) UE.

* * * * *